US009349007B2

(12) United States Patent
Born

(10) Patent No.: US 9,349,007 B2
(45) Date of Patent: May 24, 2016

(54) WEB MALWARE BLOCKING THROUGH PARALLEL RESOURCE RENDERING

(71) Applicant: THE UNITED STATES OF AMERICA AS REPRESENTED BY THE SECRETARY OF THE AIR FORCE, Washington, DC (US)

(72) Inventor: Frank H. Born, Westernville, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 14/290,175

(22) Filed: May 29, 2014

(65) Prior Publication Data

US 2015/0347754 A1    Dec. 3, 2015

(51) Int. Cl.
*G06F 11/00* (2006.01)
*G06F 21/56* (2013.01)
(52) U.S. Cl.
CPC .................................... *G06F 21/566* (2013.01)
(58) Field of Classification Search
CPC ........... G06F 7/04; G06F 15/16; G06F 17/20; G06F 15/173
See application file for complete search history.

(56) References Cited

U.S. PATENT DOCUMENTS

| 8,464,318 | B1* | 6/2013 | Hallak ............... H04L 63/1416 726/4 |
| 2009/0300111 | A1* | 12/2009 | Rana ................ G06F 17/30905 709/203 |
| 2012/0110433 | A1* | 5/2012 | Pan et al. ....................... 715/234 |
| 2013/0046869 | A1* | 2/2013 | Jenkins ................... H04L 67/22 709/223 |

* cited by examiner

*Primary Examiner* — Dede Zecher
*Assistant Examiner* — Dereena Cattungal
(74) *Attorney, Agent, or Firm* — Joseph A. Mancini

(57) ABSTRACT

Apparatus and method for transforming Web resources into safe versions such that malicious code on the resources cannot attack the client viewing the resources. The invention separates the processing of insecure code from the processing of benign code. For Web pages, the benign code is displayed immediately to the client while insecure code is processed on a separate machine. Once insecure code is processed, benign outputs of that code are passed to the client for display. The invention safeguards the client against known and zero day exploits without requiring a catalog of malware/virus signatures, heavyweight code checkers, complete page re-writing or highly restrictive access policies. The invention provides the client with complete malware blocking while retaining most of the original functionality of the Web resource.

2 Claims, 3 Drawing Sheets

WEB MALWARE BLOCKING THROUGH PARALLEL RESOURCE RENDERING

STATEMENT OF GOVERNMENT INTEREST

The invention described herein may be manufactured and used by or for the Government for governmental purposes without the payment of any royalty thereon.

BACKGROUND OF THE INVENTION

Malicious code that is included in Web resources is the predominant means through which computers are infected. If there is malicious code on a resource that a user downloads from the Web, that code will be downloaded to the client's computer and try to infect it. There are many ways to hide the malicious nature of the code including obfuscating the code, morphing it regularly to change how it looks to scanners, and burying it down several layers through a chain of files invoking other files. With the number of Web resources totaling in the billions it is infeasible to clean up, black list or even locate most of those malicious items on the Web especially in light of the efforts by the hackers to hide the malicious intent of those files.

It is estimated that less than 20% of existing malware on the Web is hosted on resources that were created specifically for the purpose of hosting malicious code. The vast majority of the Web pages that host malicious code are legitimate pages that have themselves been hacked. The purpose of this hacking is to plant malware on the page so that it can in turn try to infect or steal data from anyone who views the resource. Hackers who plant the malware may also be selective in what sites they try to infect. High use sites that are infected will cast a wide net for unsuspecting users, but sometimes a particular high value target or a segment of the population is being targeted. In this case the hacker may try to infect sites that are frequented only by users in a particular industry or locale. No matter what the target is, Web resources are a persistent source of malicious code that users need to be protected from. This invention addresses this need, to protect users from being attacked by malicious code that is contained in the Web pages and other files that they download from the Web.

Current methods to protect users from Web based malicious code generally fall into two or three types: The first method for blocking malicious code that accompanies Web resources is called signature analysis. It uses known signatures of malicious code to detect and block malware from executing in the browser. The limitation of this method is that this only detects and disables malware that was already known to be in existence. If the malware is being used for the first time, or has not been discovered and cataloged by a security agency, it will not be detected. Signature analysis also often fails when malware is disguised or morphed such that it is no longer identifiable by its previously known signature. If the signature for the malicious code is not on the black list then the analysis tool will not detect that it is malicious. For this reason, a significant amount of malware is invisible to the signature analysis tool. The higher the value of the target, the more effort an attacker would put into making sure that the malicious code will go undetected by existing signature analysis tools.

Blacklisting of Web addresses, or URLs, is a method used to block access to specific sites, categories of sites or entire segments of the Web to help safeguard users from Web based malware. Internet proxies are used by many organizations to block users from accessing entire segments of the internet that may have a higher likelihood of being infected. Blacklisting at the URL level has the same failing as the blacklisting at the code level. Internet borne malware is dynamic and blacklists are incapable of keeping up with the large number of infected sites and the rapidity that sites are infected or subsequently cleaned. This method suffers both a high false positive and a high false negative rate—resulting in limited gains in security and increased user dissatisfaction.

Another method for keeping the user safe when accessing the Web is to disable all executable code in the browser. The term executable code is used here to denote the computer code that accompanies a Web page that can perform functions other than just defining the look of a Web page (IE Hypertext Markup Language (HTML) and or Cascading Style Sheets (CSS) are not considered to be executable code). While disabling all executable code is an effective strategy for stopping malicious code from functioning it has a significant downside in that it negatively impacts the functionality of the pages that the user views. Most Web pages rely on executable code to keep the content of the site fresh and to interact with the user. The lack of functionality associated with completely blocking executable code will often cause the user to turn the feature off and thus opening themselves up to attack.

Web browsers process pages based on a complex interaction between a display oriented code (HTML and CSS) and executable code (IE JavaScript and Java). This interaction is simplified by an item created by the browser called the Document Object Model (DOM). Browsers create the DOM when processing the code to display a page. The DOM is a hierarchical listing that defines the structure of the page and the contents of each item in that structure. In order for executable code to make changes to the page it must make changes to the DOM. The browser then makes the changes to the page based on the new revisions to the DOM. Executable code that accompanies a Web page is used for many functions including validating form inputs, making changes to the page based on user mouse movements (ie showing or hiding pictures, text or menu items) and interacting with an external site through the use of Asynchronous JavaScript and XML (AJAX) to bring new content to the page without having to refresh the whole page. Most of these functions are accomplished by the executable code changing the DOM. This invention capitalizes on the use of the DOM as an intermediary between executable code that is potentially dangerous and the display layer code that is generally benign.

Advances in browser functionality since 2012 provide features that may be instrumental in simplifying the implementation of this present invention. These features include Web Real Time Communication (WebRTC) and DOM Mutation Observer. WebRTC is a technology that allows Peer-to-Peer interaction directly between two browsers. This would allow direct interaction between the browser on the client machine and the browser on a rendering machine that receives the Web page in parallel with the client. The peer-to-peer connection should significantly improve the connection speed between both browsers. If the security of this connection can be assured it could provide great benefit to the implementation of this technology. Mutation Observer is a new browser capability allows for easy tracking of the changes (mutations) to the DOM. Software that tracks the mutations to the DOM is able to summarize the results such that the data generated by each page change is greatly reduced. In this invention where changes to the DOM on one processor are also transferred to another processor, the capability provided by Mutation Observers will be instrumental in making this invention doable.

OBJECTS AND SUMMARY OF THE INVENTION

It is therefore an object of the present invention to protect internet users from malicious code (i.e. malware) that can be encountered when interacting with the internet.

It is another object of the present invention to protect internet users from malicious code for which the signatures are previously unknown.

It is yet another object of the present invention to protect internet users from malicious code that is disguised or morphed from a previously known signature.

It is still another object of the present invention to overcome the limitations of blacklisting URLs as a method to protect internet users from malicious code.

It is still yet another object of the present invention to overcome the limitations of having a browser's executable code disabled as a method to protect internet users from malicious code.

Briefly stated, the present invention provides an apparatus and method for transforming Web resources into safe versions such that malicious code on the resources cannot attack the client viewing the resources. The invention separates the processing of insecure code from the processing of benign code. For Web pages, the benign code is displayed immediately to the client while insecure code is processed on a separate machine. Once insecure code is processed, benign outputs of that code are passed to the client for display. The invention safeguards the client against known and zero day exploits without requiring a catalog of malware/virus signatures, heavyweight code checkers, complete page re-writing or highly restrictive access policies. The invention provides the client with complete malware blocking while retaining most of the original functionality of the Web resource.

In a preferred embodiment of the present invention, an apparatus for transforming internet resources into safely rendered versions of the same, comprises at least one rendering computer processor; at least one proxy computer processor; at least one client computer processor, at least one internet resource provider processor having a connection to the internet; and a computer software program containing computer executable instructions stored on a non-transitory medium, which, when read by the rendering computer processor and the proxy computer processor, will render the contents of the internet resources by causing the proxy computer processor to retrieve from the internet resource provider processor an internet resource upon request from either the client computer processor or the rendering computer processor and by causing the proxy computer processor to provide the rendering computer processor and the client computer processor the internet resource; and when the internet resource is not a web page, causing the rendering computer processor to provide a remotely viewed version of the internet resource to the client computer processor.

Further, in a preferred embodiment of the present invention, an apparatus for transforming internet resources into safely rendered versions of the same, when said internet resource is a web page, a rendering browser renders the webpage in its entirety using the original codeset, opens a communications channel to the client browser, sends Document Object Model updates to the client browser, sends page requests to the proxy computer processor, sends any changes in the rendering browser's version of the webpage to the client browser, continually listens for client actions from the client browser, implements client browser actions, and requests new webpages from the proxy computer processor. The client browser renders the webpage using only code that is known to be benign, opens a communications channel to the rendering browser, continually listens for Document Object Model updates from the rendering browser, makes webpage changes according to any new Document Object Model structure, and sends client actions to the rendering browser.

Yet further in a preferred embodiment of the present invention, an apparatus for transforming internet resources into safely rendered versions of the same, when the internet resource is other than a web page, the computer executable instructions determine whether the internet resource can be converted to a secure format and whether a new format is acceptable to a client, and if so; convert said internet resource to a secure format and send said converted internet resource to said client. Otherwise, when the internet resource is not a web page, the computer executable instructions send the internet resource to the rendering browser, send a framework for remotely viewing the internet resource to the client browser, enable a secure communications channel between the rendering browser and the client browser, enable the rendering browser to provide a remote view of the internet resource to the client browser, enable the client browser to pass actions back to the rendering browser, enable the rendering browser to make changes to the view of the internet resource according to the client browser actions, and enable the rendering browser to provide the changed view of the internet resource to the client browser.

DETAILED DESCRIPTION OF THE PREFERRED EMBODIMENT

Figure 1:
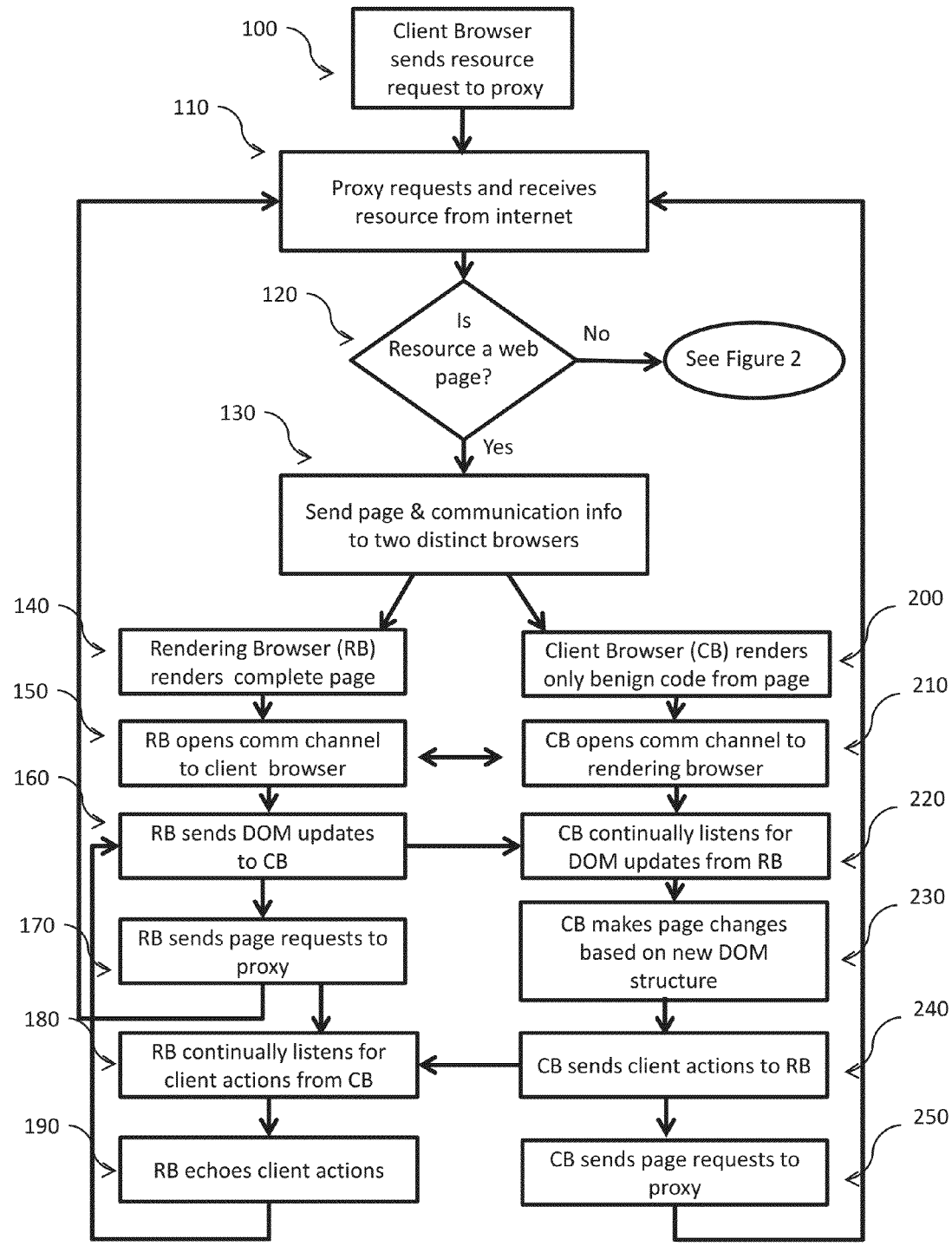
FIG. 1 depicts a flow diagram that shows the steps for using parallel rendering of internet resources to ensure the internet resource does not execute any malicious code at the client computer. This figure focuses on the steps required if the resource is a Web page.

The present invention safeguards access to resources on the internet against malicious code that accompanies many of those resources. In particular the present invention ensures that a user can safely access Web resources because no malicious code will be allowed to execute in the user's browser. The invention does not depend on the ability to identify malicious code in order to block it. The invention also restores much of the functionality that would be lost by disallowing the execution of any executable (potentially dangerous) code in the client browser. Lastly the invention will generally provide the client a version of the resource to view without the delay associated with prior art serial type systems that run security protection mechanisms prior to the client receiving the resource.

Simply explained, the core method the present invention uses to protect a user from malicious code involves using parallel rendering of the initial version of a Web resource—one browser executing the potentially dangerous code in the page and one browser not processing that code. Changes to the DOM structure caused by the executable code on one browser are then echoed in the DOM on the other browser. Thus only the benign results (i.e. changes in page layout) of the executable code are transferred to the user's browser where security is maintained. This enables the client browser to benefit from the outputs of executable code on a separate machine without ever having to host or run the executable code.

The present invention provides a method and apparatus for parallel processing of two versions of a Web resource for the purpose of providing a safe, functional version of the Web resource to the client in a timely manner. One of the parallel processors is the client and the other is identified here as a rendering processor. The client processor will initially execute a limited version of the resource with only known good code. The functionality that is lost by stripping off any potentially dangerous code will be restored by processing that code on a separate machine and sending the benign outputs of that code to the client browser. The present invention does this 1.) while minimizing the delay associated with code analysis, 2.) without significant loss of functionality associated with disabling all executable scripts, and 3.) without the loss of access to Web resources that result from security policies that restricts access to segments of the internet.

The code that makes up a Web resource can be categorized into three types, that which is known to be safe (benign), that which is indeterminate as to its safety, and that which is known to be malicious. The present invention will only allow the client browser to execute code of the first type (known benign). Code of the second type (indeterminate) will only be executed at an isolated rendering processor and only its benign outputs will be passed on to the client browser. Code of the third type, that which is known to be malicious, can be stripped off without being processed at either processor.

The preferred method for creating safe versions of Web resources comprises a method for separation of computer code that makes up a Web resource according to its potential to be malicious and treating each resultant type of code according to a different rule set. It also involves dispersing the processing of the different types of code at two separate processors. The object of the present invention is to supply to the client browser completely safe versions of requested Web resources in a timely manner and without significant degrading of either the availability of those Web resources or the functionality of the Web resources.

The bulk of the Web consists of HTML based pages (Web pages) but there are many other file formats that are accessed through the Web. Differences exist between these many types of resources. Web pages are primarily built of HTML, CSS and JavaScript code and varied image types. The bulk of the malware is contained in the JavaScript code. Much of the discussion to this point has been directed toward thwarting the attacks that come through Web pages. However, the other types of Web resources can also carry malware and must be protected against. These other resources have a fundamentally different file structure than Web pages. There is no DOM that can act as an intermediary between the client and the rendering processor with these other resources. Document formats like Portable Document Format (PDF), MS Word or others will require different techniques to ensure that they cannot infect the client through their browser. The techniques that can provide security against these types of resources include remote viewing of the resource through a window in the browser, conversion of the resource from one type to another, or manipulating portions of the resource before it reaches the client browser such that the sections of the resource that can hold malicious content are fully disabled. In a PDF document, for example, the potentially malicious code must be contained in the document at certain locations only.

The connection between the client and rendering processor can be direct Peer to Peer (P2P) or it can be facilitated through an intermediary. A relatively new browser technology called WebRTC enables the direct peer to peer browser connections. This technology would allow faster connections between the client and the browser on the rendering processor. Other methods for communications between the client the renderer include going through the proxy as an intermediary for passing data or having the client directly addressing the rendering processor in a client-server type of configuration.

When the browser is configured to automatically go through the proxy, the browser controls such as the forward and back buttons, history and favorite records should be able to be used as normal. If the browser is not configured to automatically go through the proxy, additional controls may need to be added to the page to handle these normal browser functions and also to alter links and forms to point to the desired location.

The rendering processor will typically be on a virtual machine that can be refreshed frequently, possibly after every browsing session. Separate rendering processors might be invoked for every browser tab the client opens. The rendering capability should be hosted on a secure operating system and should use as secure a browser as possible. The rendering processor's operating system and browser will also be "locked down" such that the minimum numbers of services are running. This will greatly reduce the attack space for the rendering processor as compared to the client processor.

Signature analysis methods and other code checking can be used at the rendering processor to decrease the potential for attack against the rendering processor. Code safety can be generalized into three categories—that with is known to be safe, that which is known to be unsafe, and that which is of unknown safety. The rendering processor will receive all three types. It is advisable to disable any code that is known to be malicious (unsafe) before it is executed on the rendering processor. This will further reduce the chance that the rendering processor will be compromised.

Referring to FIG. 1, the process flow for the preferred embodiment of the present invention is shown and can be described as follows. Note that the bulk of the processing at the rendering processor and at the client processor is accomplished in their respective browsers. This description will reference the client and rendering browsers rather than the computer processor(s) on which they depend since most of the actions are accomplished by software that runs the browser or runs in the browser.

Figure 2:
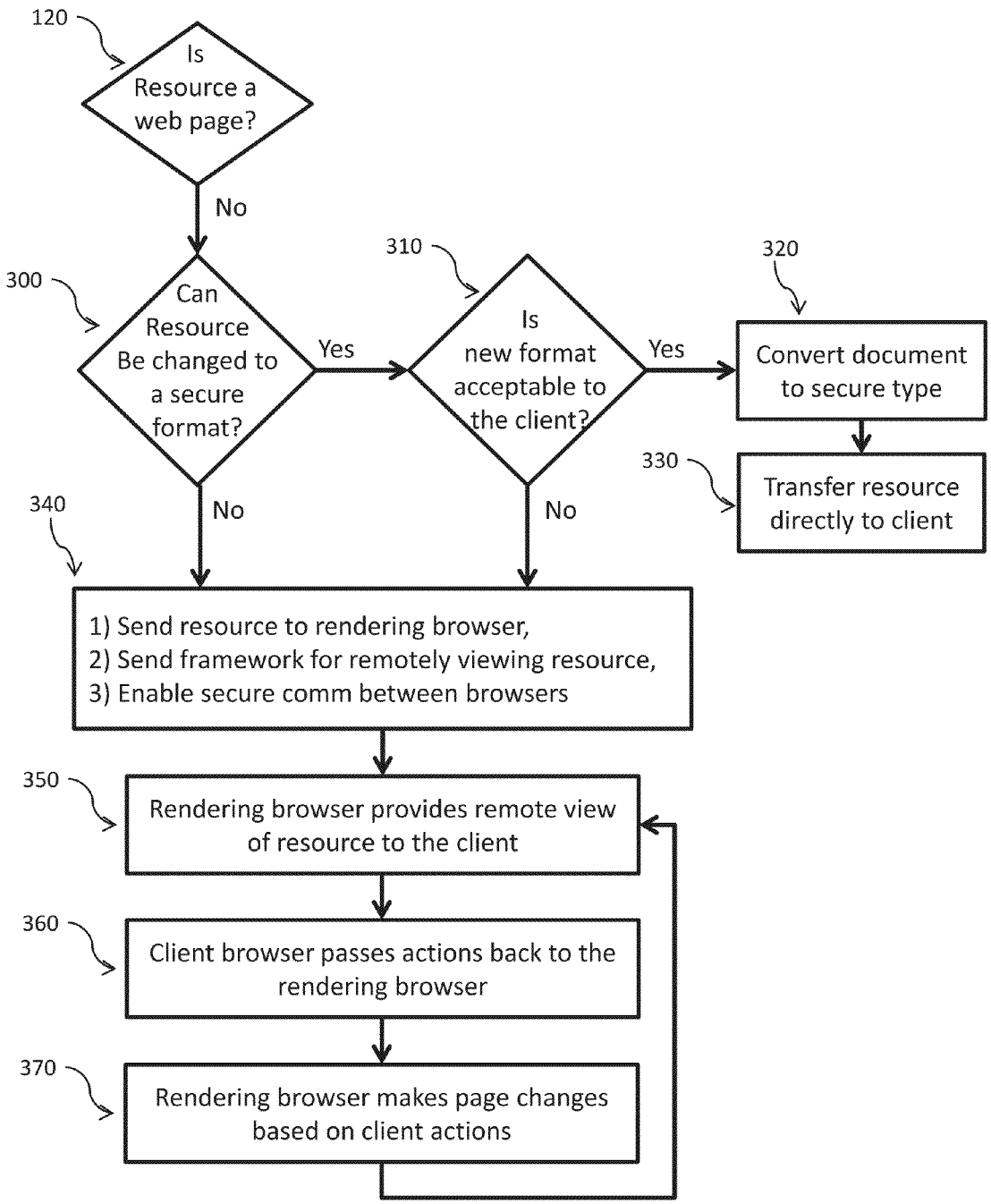
FIG. 2 depicts a continuation of the flow chart of FIG. 1 by further depicting the process required to ensure that Web resources other than Web pages are made secure for the client access/viewing.

The first action is for the client to initiate a resource request 100 for a Web resource. This page request can come in multiple forms. It could come from typing the URL in the address bar, from clicking on a link or from the browser going to the designated "Home" page. It could also come from accessing a URL from the browser history or favorites menu. The URL for the requested resource is sent to a proxy computer processor (proxy). The client browser can be configured such that the requests for new resources go to the proxy automatically. If the browser is not configured to send all requests to the proxy then software controls could be added to the incoming page to direct requests to the proxy. The proxy receives the resource request and requests and retrieves the resource from the resource providers on the internet 110. The proxy must then determine if the resource is a Web page 120. If the resource is a Web, page the proxy sends the page to both the rendering browser and the client browser and passes details for opening a connection between the two entities 130. If the resource is a different document type than a Web page then the client version would primarily consist of a "window"

through which it could view the resource as rendered in the rendering browser. (Handling of non-Web pages is shown in FIG. 2 and will be addressed later in this section). The remainder of the process flow shown in FIG. 1 addresses this invention only as it applies to Web pages. The client browser (CB) displays the Web page, using only code that is known to be benign (generally only the HTML and CSS code) 200. This will immediately give the user a version of the page to view while the rendering processor processes the entire page. The Document Object Model (DOM) created in the client browser will act as an intermediary through which changes made to a parallel version of the page (by executable code) on the rendering processor can be passed, and made visible, in the client browser. A connection needs to be opened between the client browser and the rendering browser (RB) using the credentials supplied to both parties 210, 150. When that connection is open the client browser will then commence listening for updates 220 to the page that are passed 160 to it from the rendering processor. Through this connection the client browser also passes certain mouse, keyboard and form actions to the rendering processor along with page scroll position 240. Simultaneously with the aforementioned client browser actions 200 through 240, the rendering browser renders the page using the original code set for the page 140. The rendering browser then tracks the changes to the page that accrue due to execution of the code that was not allowed to execute in the client browser. The rendering browser directly passes to the client those page changes 160 through the connection that has been established 150. If the page code called for a new resource to be loaded then that new request is sent to the proxy 170, 110. The rendering browser continually listens for further input from the client actions such as mouse movements and scrolling 180. The rendering browser implements the client actions 190. These client actions often initiate code in the rendering browser's version of the web page. The code will cause changes to the page in the rendering browser and the resultant page changes will be passed from the rendering browser to the client 160 (per the feedback loop shown in FIG. 1). New page requests can be passed from either the rendering browser 170 to the proxy, which in turn request and receives resources from the internet 110 or from the client browser 250 to the proxy, which in turn request and receives resources from the internet 110 depending on whether these page changes were the result of executable code or not. When new requests are received at the proxy, the process repeats itself.

Referring to FIG. 2 shows the process flow for resource requests when it is determined that the resource is not a Web page 120. If there are tools available to convert the file to a secure format (i.e. PDF to JPG) 300 and if this new format is acceptable to the client 310 a determination will be made about how to present the document to the client in a secure form. Two options are as follows: Option 1) If the document can be converted to a secure type 300 and that type is acceptable to the client 310 then the document will be converted 320 and it will be transferred directly to the client 330. Note that steps 300, 310, 320 and 330 could be accomplished at the proxy or at the rendering processor. Option 2) If the document cannot be converted to a secure type 300 or the new format would not be acceptable to the client 310 then the following steps are necessary 340: 1) Send the resource to the rendering browser (if steps 300 and 310 are accomplished at the rendering browser then this step would already have been accomplished), 2) Send a framework to the client browser for remotely viewing the resource as it is rendered on the rendering browser 3) ensure that both browsers have the connection information to enable them to open a secure communication channel. At this point the rendering browser can provide a remote view of the resource to the client 350. The client will then pass back actions to the rendering browser (ie scroll position) 360. Based on the client actions, the rendering browser will then make changes to the view of the resource 370 and, per a feedback loop in the flow chart, provide this revised view to the client.

Figure 3:
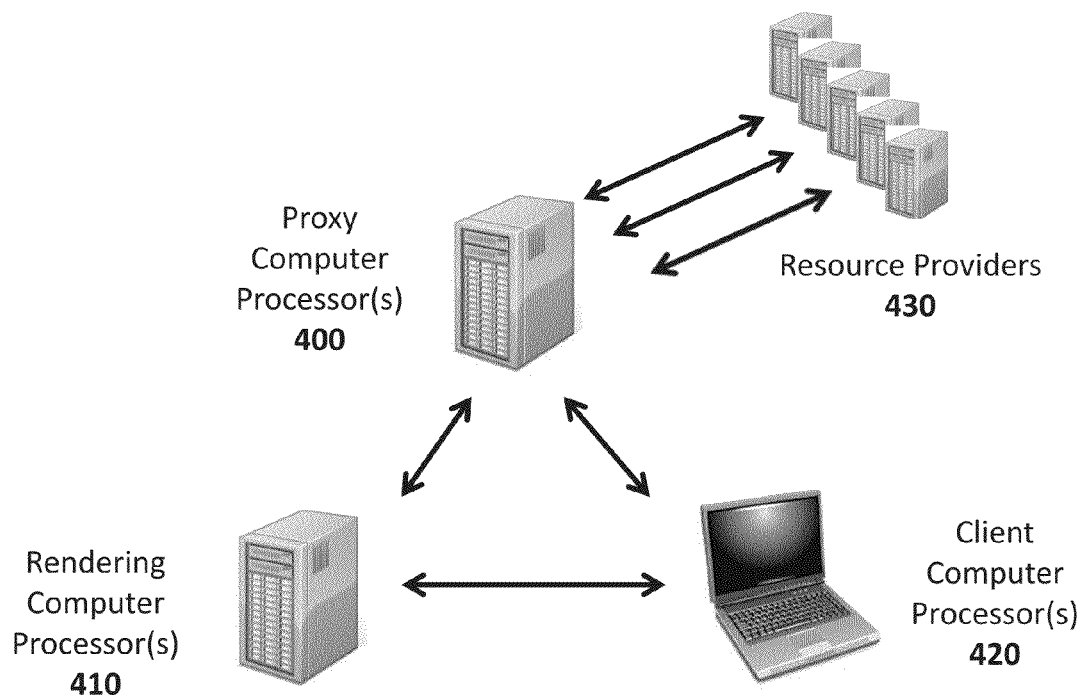
FIG. 3 depicts the relationship and interaction between the physical or virtual assets in this invention.

Referring to FIG. 3 shows the general placement and interaction of the processors involved in this invention. For this description the term "computer processor" will also include multicore processor computers or multiprocessor computers. They could also be "virtual" processors, meaning that they are composed entirely of software that runs on another machine. The Proxy Computer Processor 400 is situated between the Resource Providers 430 and the computer processors that secure the resource (Rendering Computer Processor) 410 and display the resource (Client Computer Processor) 420. Within the Rendering Computer Processor the bulk of the work is being done in the Rendering Browser that is referenced in FIG. 1 and FIG. 2. Similarly, within the Client Computer Processor the bulk of the work is being done within the Client Browser that is referenced in FIG. 1 and FIG. 2. The Proxy Computer Processor is just referred to as "Proxy" in FIG. 1 and FIG. 2.

Interaction shown in FIG. 3 is as follows: In response to a request from either the Client Computer Processor 420 or the Rendering Computer Processor 410, the Proxy Computer Processor 400 will retrieve a Web resource from the Resource Providers 430 through an internet connection. The Proxy 400 will then interact with both the Rendering Processor 410 and the Client Processor 420 to give them some form of the resource, or in a limited case described in FIG. 2, give the Client 420 a framework for remotely viewing the resource on the Rendering Processor browser 410. Interaction between the Client Processor and the Rendering Processor is required to allow the client to see changes to the resource that accrue over time and to pass client actions back to the Rendering Processor. In some cases this interaction is necessary for the client to remotely view potentially dangerous file types. This interaction can be conducted in one of three ways; 1) On a direct Peer to Peer basis between the Client 420 and the Renderer 410, 2) It can be facilitated by the Proxy 400, or 3) it can be accomplished by using the Rendering Processor 410 as a server and the Client 420 can access dynamic content through a traditional client-server relationship. Note that any or all of the items depicted in this figure can be real physical assets or virtual assets created by virtual machine software technology. Virtual computer processors will behave identically to physical computer processors but they have an advantage in that they are easily refreshed and set back to a known state. Thus the use of virtual assets will make recovery a simple process if either the Proxy Processor 400 or the Rendering Processor 410 are compromised by malicious code. Also note that the placement of the Proxy 400 and the Rendering Processor 410 is flexible. Either or both of them could be located remotely from the Client 420 and accessed through the internet, or they could be located in proximity to the Client 420, possibly behind an enterprise firewall. The Resource Providers 430 could represent any content provider on the internet and would be the source of the malicious code that this invention seeks to block.

What is claimed is:

1. An apparatus for transforming internet resources into safely rendered versions of the same, comprising:
   at least one a rendering computer processor;
   at least one proxy computer processor;
   at least one client computer processor;

at least one internet resource provider processor having a connection to the internet; and a computer software program containing computer executable instructions stored on a non-transitory medium, said computer executable instructions further comprising a rendering browser and a client browser, which, when read by said rendering computer processor and said proxy computer processor, will render the contents of said internet resources by causing said proxy computer processor to retrieve from said internet resource provider processor an internet resource upon request from either said client computer processor or said rendering computer processor;

causing said proxy computer processor to provide said rendering computer processor and said client computer processor said internet resource; and when said internet resource is not a web page, causing said rendering computer processor to provide a remotely viewed version of said internet resource to said client computer processor; and when said internet resource is a web page, said rendering browser renders said webpage in its entirety with original codeset;

opens a communications channel to said client browser;

sends Document Object Model updates to said client browser;

sends page requests to said proxy computer processor;

sends any changes in rendering browser's version of said webpage to said client browser;

continually listens for client actions from said client browser; and implements client browser actions; and when said interne resource is a web page, said computer executable instructions send web page information and communications information to said rendering browser and said client browser; and said client browser, in parallel with said rendering browser's rendering actions renders said webpage with only benign code and only thereafter opens a communications channel to said rendering browser;

continually listens for Document Object Model updates from said rendering browser;

makes webpage changes according to any new Document Object Model structure;

sends client actions to said rendering browser; and sends new webpage requests to said proxy computer processor.

2. The apparatus of claim 1, wherein any of said at least one a rendering computer processor;

at least one proxy computer processor;

at least one client computer processor; and at least one internet resource provider processor are implemented as either virtual or physical devices; and when said internet resource is other than a web page, said computer executable instructions determine whether the internet resource can be converted to a secure format and whether a new format is acceptable to a client, and if so;

convert said internet resource to a secure format; and send said converted internet resource to said client;

otherwise, send said internet resource to said rendering browser;

in parallel with sending said internet resource to said rendering browser, send a framework for remotely viewing said internet resource to said client browser;

enable a secure communications channel between said rendering browser and said client browser;

enable said rendering browser to provide a remote view of said internet resource to said client browser;

enable said client browser to pass actions back to said rendering browser;

enable said rendering browser to make changes to the view of said internet resource according to said client browser actions; and enable said rendering browser to provide said changed view of said internet resource to said client browser.

\* \* \* \* \*